United States Patent

[11] 3,629,870

| [72] | Inventor | Herbert J. Paisley<br>392 Lyle Street, Winnipeg 12, Manitoba, Canada |
|---|---|---|
| [21] | Appl. No. | 880,878 |
| [22] | Filed | Nov. 28, 1969 |
| [45] | Patented | Dec. 28, 1971 |

[54] INSTRUMENT FLYING TRAINING DEVICE
1 Claim, 5 Drawing Figs.

[52] U.S. Cl. .................................................. 2/15, 35/12 G, 2/13
[51] Int. Cl. .................................................. A61f 9/04
[50] Field of Search ........................................... 2/15, 12, 13, 14, 14 A, 14 XS; 35/12 G; 351/47, 48

[56] References Cited
UNITED STATES PATENTS

| 2,342,377 | 2/1944 | Small | 2/12 |
| 2,368,117 | 1/1945 | Damian | 35/12 G UX |
| 2,388,626 | 11/1945 | Wilson | 2/13 UX |
| 2,541,242 | 2/1951 | Grove | 2/13 |
| 2,870,446 | 1/1959 | Mitchell | 2/12 |
| 3,237,205 | 3/1966 | Claudel | 2/15 |
| 3,436,761 | 4/1969 | Liautaud et al. | 2/13 |

Primary Examiner—James R. Boler
Attorney—Kent & Ade

ABSTRACT: A nose-engaging portion having temple strips hinged to each end with peripheral vision shields on each temple strip and a vision shield hinged to the upper edge of nose-engaging portion with rearwardly and downwardly angulated end portions to said vision shield.

INVENTOR.
HERBERT J PAISLEY

BY

AGENTS

INSTRUMENT FLYING TRAINING DEVICE

This invention relates to new and useful improvements in instrument flying training devices more popularly known as instrument flying goggles.

The majority of devices adapted for use as instrument training aids, either consist of canopies covering the windows, or enclosing the pilot or, alternatively, some form of goggle-type device with flaps purporting to prevent the pilot under training from viewing the external environment.

Apart from the device in which curtains actually cover the windows, it is relatively easy for the pilot under training to glance from under the goggles or the like through the windows and although this may not be done purposely, nevertheless it is often done inadvertently.

The disadvantage to shields covering the windows is that the first pilot is limited in his own view, it being appreciated that he acts as a lookout under all conditions during the period of instrument flying training.

The present device overcomes these disadvantages by providing a relatively simple construction which is fully adjustable for all circumstances and which furthermore prevents inadvertent glancing through the windows, particularly a peripheral glance which is the most common.

The principle object and essence of the invention is to provide a device of the character herewithin described which provides a main forward vision shield, angulated side portions, and peripheral vision shields, the adjustment of the main vision shield also altering the angle of the side portions which, in conjunction with the peripheral vision shield, prevent glancing through the full range of vision including peripheral vision.

Another object of the invention is to provide a device of the character herewithin described which is easily attached and detached from the head of the wearer, a matter of some importance during an emergency.

A yet further object of the invention is to provide a device of the character herewithin described in which the main vision shield can easily be flipped upwardly clear of the eyes when desired, a matter of some importance as the pilot under training can easily induce instrument flying conditions without having to fit the goggles to his head each time.

A yet further object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

In the drawings like characters of reference indicate corresponding parts in the different figures.

Figure 2:
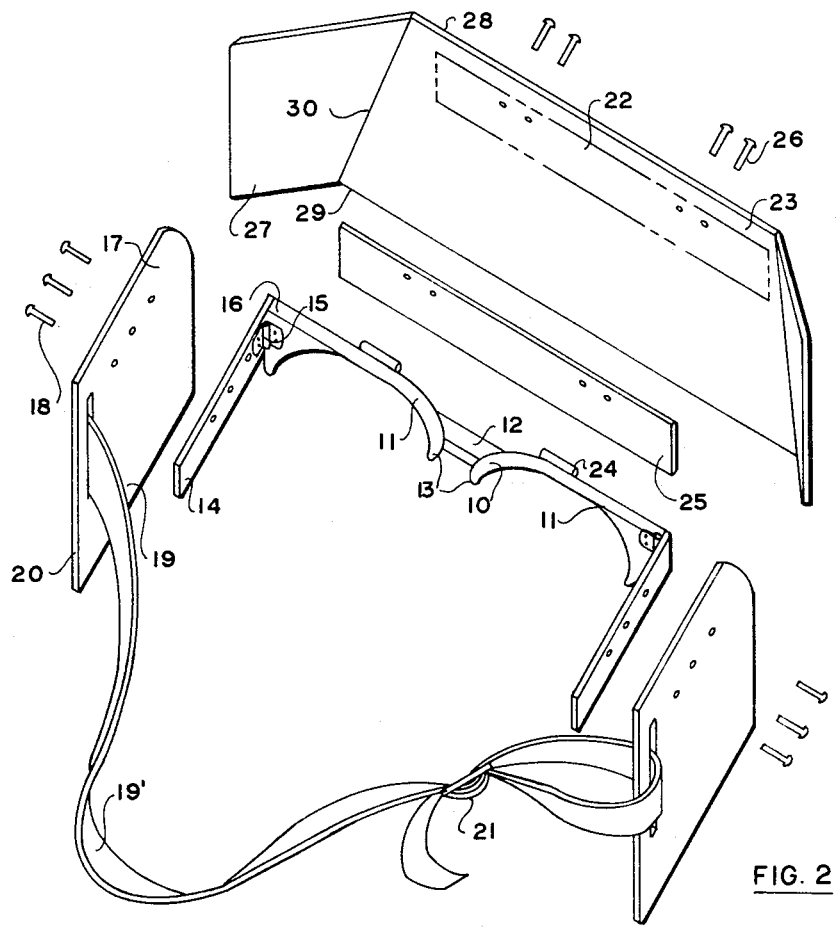
FIG. 2 is a view similar to FIG. 1 but showing an alternative embodiment.
Figure 3:
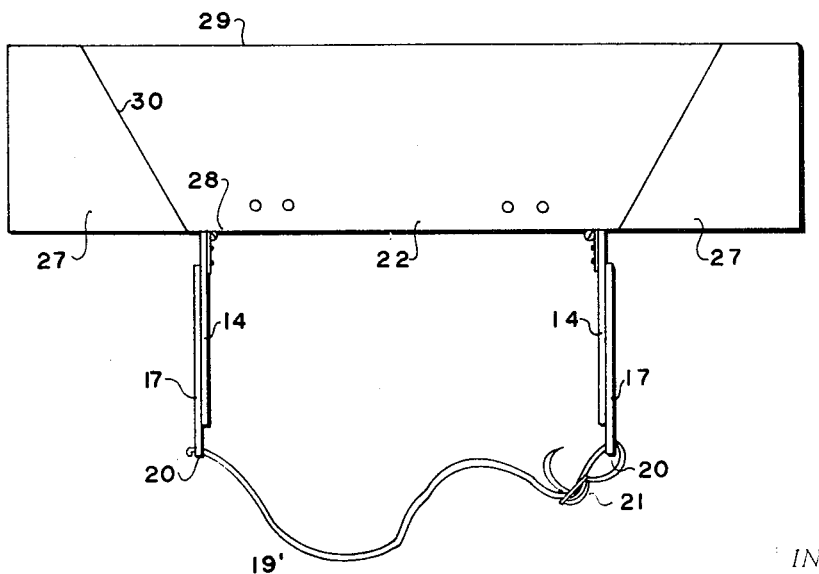
FIG. 3 is a top plan view of the embodiment of FIG. 2 showing the shield in the raised position.
Figure 4:
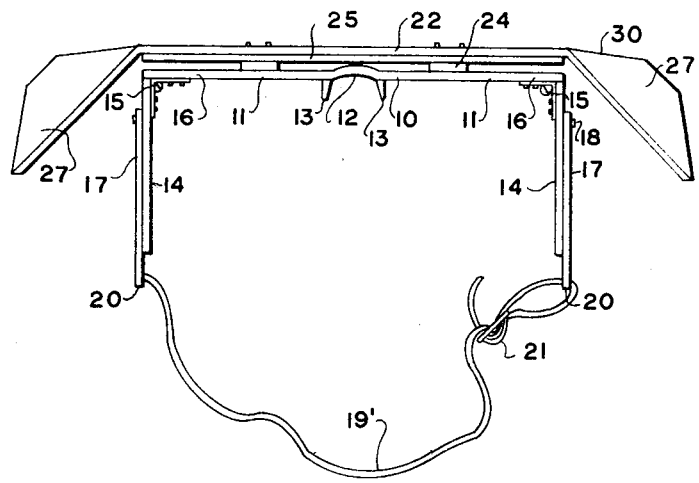
FIG. 4 is a view similar to FIG. 3 but showing the shield in the lowered position.

Proceeding therefore to describe the invention in detail, reference should first be made to FIG. 2 in which I have shown a transversely elongated eye and nose bridging support member 10. This consists of upper eye surround portions 11 which are arcuately curved and which are joined by the bridge 12 which, in conjunction with the ends 13 of the portions 11, engage over the bridge of the nose in a manner very similar to the well known spectacles.

Means are provided to detachably secure the device around the head of the wearer and take the form of a pair of relatively short temple-engaging strips 14 hinged by hinges 15 to the ends 16 of the eye portions 11 thus enabling the spacing of the temple-engaging portions to be adjusted within limits.

I secure a substantially rectangular peripheral vision shield 17 to each temple-engaging strip 14 by means of rivets 18 extending through meeting apertures within the shield and the temple-engaging portion 14 and those portions extend substantially vertically when in use with the major area 19 being below the temple-engaging portion which is, of course, above eye level when engaged upon the head of the wearer.

A flexible and resilient band 19' extends between the rear edges 20 of these peripheral vision shields, conventional adjustment being provided at 21. This enables the device to be held around the head of the wearer firmly and comfortably.

A main vision shield 22 is hingedly secured adjacent the upper edge 23 thereof to the eye portions 11 by means of hinges 24 so that it may hinge upwardly to lie parallel with the temple embracing portions 14 or may be hinged downwardly to lie at right angles thereto and thus cover the eyes of the wearer.

A reinforcing strip 25 is preferably secured to the main shield 22 by means of rivets 26 and the hinge in turn is secured to this reinforcing strip 25.

A side flange portion 27 is formed integrally with the main vision shield 22 upon the ends thereof and the junction between the side flange portions 27 and the main vision shield 22 inclines downwardly and outwardly from the upper edge 28 of the main vision shield towards the lower edge 29 thereof, said inclined junction line being indicated by reference character 30. This angulates the portions 27 rearwardly and downwardly with respect to the main vision shield so that by adjusting the main vision shield to the required position, the angulated side flaps or portions 27 cooperate with the peripheral vision shields 17 to give complete shielding from glancing outwardly or upwardly through the entire range of eye movement including peripheral vision.

It will of course be appreciated that the main vision shield, the peripheral vision shield, and the angulated portions 27 are manufactured preferably from an opaque plastic or similar material.

Figure 1:
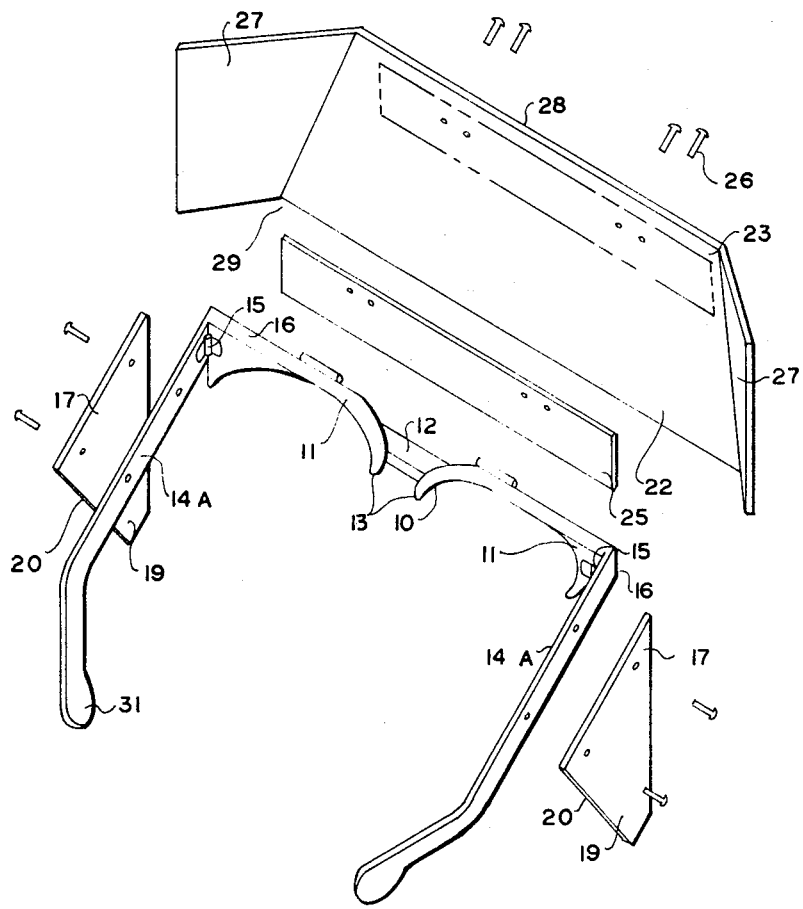
FIG. 1 is an isometric exploded view of the preferred embodiment of the device.
Figure 5:
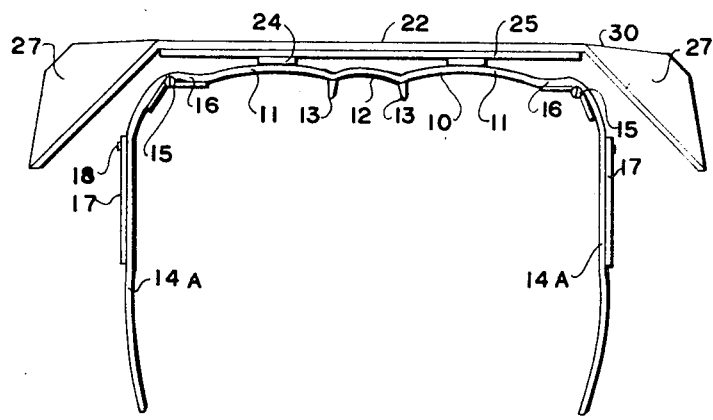
FIG. 5 is a top plan view of the embodiment of FIG. 1 with the shield in the lowered position.

FIGS. 1 and 5 show the preferred embodiment in which common reference characters have been given.

Instead of utilizing the flexible band 19' full temple embracing strips 14A are provided very similar to spectacle temple strips wherein the downturned rear ends 31 may engage over the ears in the usual manner.

I have found that this more convenient in use and permits the device to be removed and installed readily.

In operation, the main vision shield is adjusted so that the entire instrument panel of the aircraft is visible but preventing upward glancing through the windows of the aircraft.

The side flange portions 27 cooperate with the peripheral vision shields 17 to prevent upward and outward glancing through the entire range of vision. The adjustment of the front or main vision shield permits the correct positioning for pilots of all heights and in aircraft having instrument panel designs which, of course, vary in height and width.

Various modifications can be made within the scope of the inventive concept which is herein disclosed and/or claimed.

What I claim is:

1. An eye shield device for instrument flight training, comprising in combination, a transversely elongated eye and nose bridging support member, a pair of rearwardly extending temple pieces connected to the ends of said support member and adapted for holding the same in position on a user's head, a pair of vertical side shields carried by the respective temple pieces, said side shields having front edges located substantially at the ends of the support member with the side shields extending rearwardly therefrom, a front visor disposed forwardly of the support member and hingedly attached thereto at its upper edge for raising and lowering movement, and a pair of corner shields integral with the ends of said front visor, said corner shields slanting downwardly and outwardly from the plane of the front visor and rearwardly past the front edges of said side shields whereby to overlap the side shields and obstruct vision through spaces between the front edges of the side shields and the front visor when the latter is in its lowered position.

* * * * *